United States Patent
Chin et al.

(10) Patent No.: US 6,471,434 B2
(45) Date of Patent: Oct. 29, 2002

(54) JOINT STRUCTURE FOR STRENGTHENING STEEL PIPE STABILITY

(76) Inventors: Hsueh-Hung Chin, No. 116, Ming Sheng Road, Tsau Tuan Town, Nan Tou Hsien (TW); Philip Lo, 4F, No. 7, Lane 24, Sec. 3, Ren Ai Road, Taipei City (TW)

( * ) Notice: Subject to any disclaimer, the term of this patent is extended or adjusted under 35 U.S.C. 154(b) by 139 days.

(21) Appl. No.: 09/754,365

(22) Filed: Jan. 5, 2001

(65) Prior Publication Data

US 2002/0090256 A1 Jul. 11, 2002

(51) Int. Cl.[7] .................................................. F16B 9/02
(52) U.S. Cl. ........................ 403/175; 403/231; 403/171; 312/140
(58) Field of Search ................................ 403/491, 175, 403/217, 219, 374.3, 171; 52/204.57, 656.4, 653.2; 312/140; 248/188

(56) References Cited

U.S. PATENT DOCUMENTS

| | | | | |
|---|---|---|---|---|
| 3,677,416 A | * | 7/1972 | Block et al. | 211/186 |
| 3,749,343 A | * | 7/1973 | Marschak | 248/188 |
| 4,032,242 A | * | 6/1977 | Morris | 403/231 |
| 4,072,433 A | * | 2/1978 | Veyhl | 403/172 |
| 5,033,901 A | * | 7/1991 | Dias | 403/172 |
| 6,171,013 B1 | * | 1/2001 | Lee | 403/231 |

* cited by examiner

Primary Examiner—Robert J. Sandy
(74) Attorney, Agent, or Firm—Troxell Law Office PLLC

(57) ABSTRACT

A joint structure, which allows a user to individually assemble and strengthens the stability of steel pipes. The joint structure mainly comprises of a fixture element, which can be slipped into a vertical steel pipe, a joint block, which connects two transversal steel pipes on the inner sides, and a fixture screw, which fastens a joint block and the vertical steel pipe to unite both of the transversal steel pipes and the vertical steel pipe. On the bottom of the vertical steel pipe and the fixture element, there are overlapped fixture screw holes. Both of the inner ends of the transversal steel pipes having clip holes. On the bottom of the extension panels located on the lateral sides of the joint block, there are inert blocks, which fit exactly with the clip holes. In the middle of the joint block, there is a piercing hole. By respectively inserting both of the insert blocks on the joint block into the clip holes on two transversal steel pipes, the extension panels on both sides of the joint block fit exactly the inner end of both the transversal steel pipes. Thus, fixture screw may pass the piercing hole on the joint block and join the fixture screw holes on the vertical steel pipe and the fixture element to firmly fasten the transversal steel pipes and the vertical steel pipes. As a result, the steel pipes can be easily and conveniently dismantled and assembled by consumers to achieve the effect of reducing material volume for delivery.

4 Claims, 7 Drawing Sheets

JOINT STRUCTURE FOR STRENGTHENING STEEL PIPE STABILITY

BACKGROUND OF THE INVENTION

1) Field of the Invention

The invention provides a kind of joint structure, which allows a user to individually assemble and strengthens the stability of steel pipes. The joint structure mainly comprises of a fixture element, which can be slipped into a vertical steel pipe, a joint block, which joins two transversal steel pipes on the inner sides, and a fixture screw, which fastens a joint block and the vertical steel pipe to unite both of the transversal steel pipes and the vertical steel pipe. On the bottom of the vertical steel pipe and the fixture element, there are overlapped fixture screw holes. Both of the inner ends of the transversal steel pipes equip clip holes. On the bottom of the extension panels located on the lateral sides of the joint block, there are inert blocks, which fit exactly with clip holes. In the middle of the joint block, there is a piercing hole. By respectively inserting both of the insert blocks on the joint block into the clip holes on two transversal steel pipes, the extension panels on both sides of the joint block fit exactly the inner ends of both the transversal steel pipes. Thus, fixture screw may pass the piercing hole on the joint block and join the fixture screw holes on the vertical steel pipe and the fixture element to firmly fasten the transversal steel pipes and the vertical steel pipes. As a result, the steel pipes can be easily and conveniently dismantled and assembled by consumers to achieve the effect of reducing material volume for delivery.

2) Description of the Prior Art

The traditional joint structure for steel pipes is mainly to directly connect vertical steel pipes and transversal steel pipes with additives to form a fixed steel pipe frame. However, the frame with additives has to be assembled prior to sale. A consumer lacks of individual assembly joy. Also, because the steel pipes are assembled prior to delivery as a complete set of product, the volume of the product and shipment cost increase. Eventually, it causes burden for consumers.

SUMMARY OF THE INVENTION

The primary objective of the invention is to provide a kind of joint structure for convenient assembly, which allows a user to individually assemble and strengthens the stability of the steel pipes. The joint structure mainly comprises of a fixture element, which can be slipped into a vertical steel pipe, a joint block, which joins two transversal steel pipes on the inner sides, and a fixture screw, which fastens a joint block and the vertical steel pipe to unite both of the transversal steel pipes and the vertical steel pipe. There is a fixture screw hole on the bottom of the vertical steel pipe and the fixture element. On both of the inner lateral ends for the transversal steel pipes, there are two clip holes. The extension panels on both sides of a joint block can be perfectly inserted into the insert blocks on the clip holes. In the middle of the joint block, there is a piercing hole. Through inserting the insert blocks on both sides of the joint block respectively into the clip holes on the transversal steel pipes, the extension panels on both sides of the joint block exactly hit the inner rim of two transversal steel pipes. Thus, the fixture screw may pass the piercing holes on the joint block and connect the fixture screw hole on the vertical steel pipes and fixture element to firmly fasten the transversal steel pipes and the vertical steel pipes. As a result, the steel pipes can be easily and conveniently dismantled and assembled by consumers to achieve the effect of reducing material volume for delivery.

The followings are brief description for optimal embodiments of the invention for committee's better understanding in the structural characteristics and operations of the invention.

BRIEF DESCRIPTION OF THE DRAWINGS

FIG. 1A is a reverse isometric drawing of a joint block.

FIG. 1B is another isometric drawing of the fixture element.

FIG. 4A is a reverse isometric drawing of a joint block.

DETAILED DESCRIPTION OF THE PREFERRED EMBODIMENT

Figure 1:
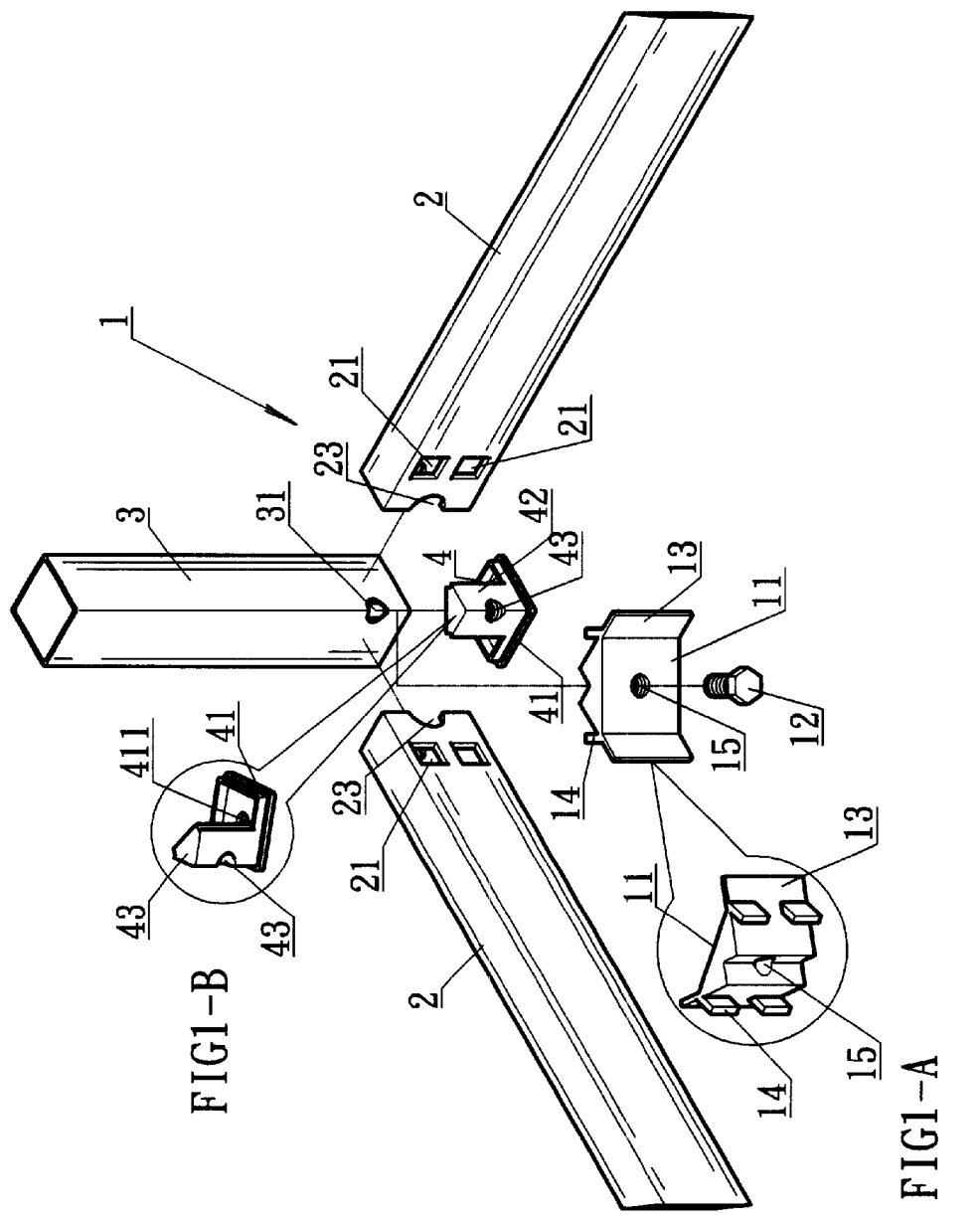
FIG. 1 is an exploded drawing of a vertical steel pipe and two transversal steel pipes.
Figure 2:
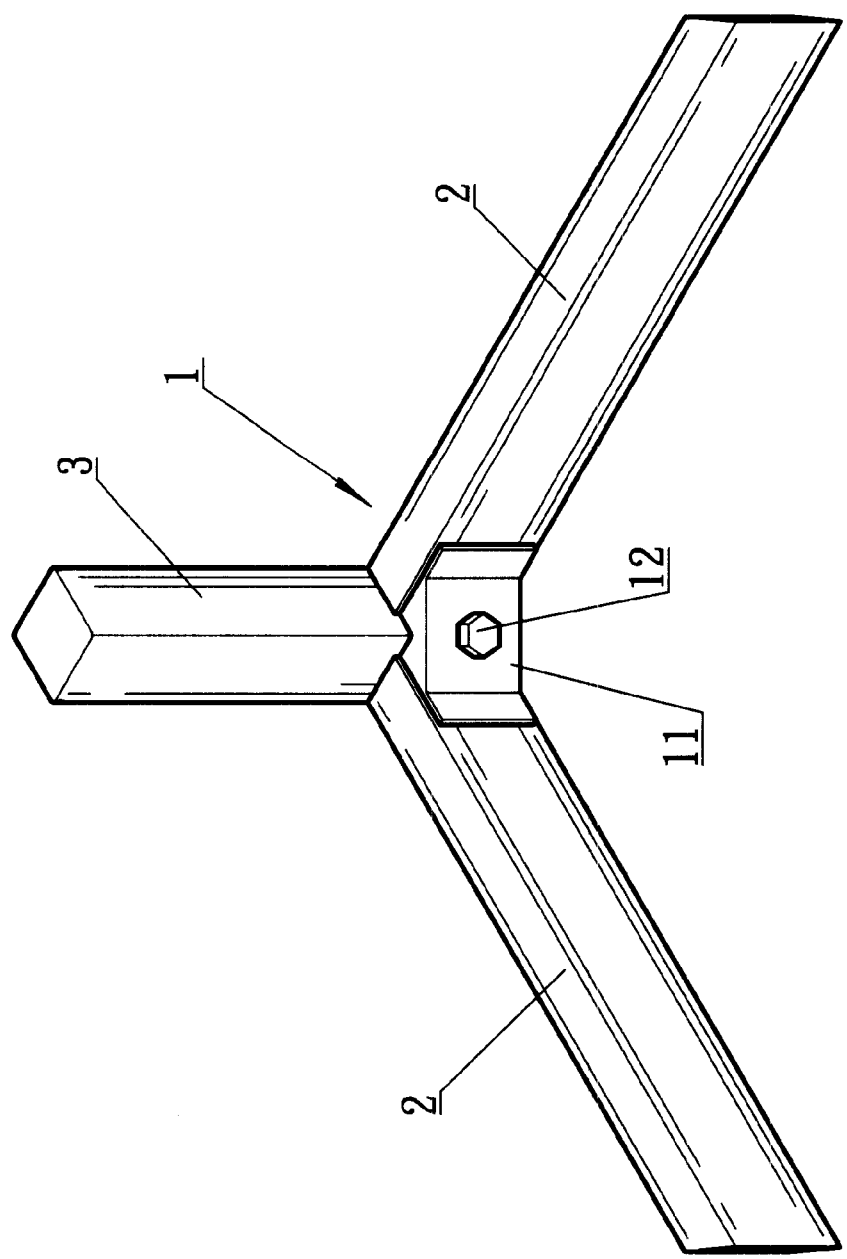
FIG. 2 is an assembly isometric drawing of a vertical steel pipe and two transversal steel pipes.

As shown in FIG. 2, the structural appearance of the invention is clearly illustrated. The joint structure 1 mainly comprises of a fixture element 4, which can be slipped into a vertical steel pipe 3, a joint block 11, which connects two transversal steel pipes on the inner sides, and a fixture screw, which fastens the joint block 11 and the vertical steel pipe 3 to unite both of the transversal steel pipes and the vertical steel pipe 3. There is a punched fixture screw hole 31 on the suitable front corner of the vertical steel pipe 3. The transversal steel pipe 2 is in hollow structural appearance. On both of the lateral sides for the transversal steel pipes 2, there are clip holes 21. Also, there are respectively arch openings 23 beside the clip holes 21, which are located on the joint of two transversal steel pipe 2. After joining the arch openings 23, a circular hole is formed. It properly fits the fixture screw hole 31 on a vertical steel pipe 3.

There are two extended panels 13 on both ends of the joint block 11. Beside the extended panel 13, there are two insert blocks 14, which can be exactly inserted into the clip hole on the transversal steel pipes. Also, there is a piercing hole in the center of the insert block.

On the bottom, the fixture element 4 equips a base 41 to fit the inner wall of a vertical steel pipe 3. The base 41 extrudes upward to hit a right-angle fixture base 42 on four corners of the inner wall of the vertical steel pipe 3. The fixture base 42 equips a fixture screw hole 43, which is overlapped with the vertical steel pipe. Besides, there is a screw hole 411 on the bottom of the fixture base to adjust a base 8 and a sucking disk 81.

Through respectively inserting insert blocks 14 beside the joint block 11 into the clip holes 21 on two right-angle transversal steel pipes 2, both sides of the joint block 11 exactly hit the inner ends of two transversal steel pipes 2. Thus, the transversal steel pipes and the joint blocks are united to allow fixture screws 12 pass the piercing hole 15 and the arch opening 23 on the transversal steel pipe, then they directly fasten the vertical steel pipes and the fixture screw holes 31 and 43 on the transversal steel pipes for the fixture of two transversal steel pipes 2 and vertical steel pipes 3. The assembly is quick and convenient. A user may assemble individually. Also, the steel pipes can be easily dismantled and assembled, the effect in reducing material delivery volume is achieved.

Figure 3:
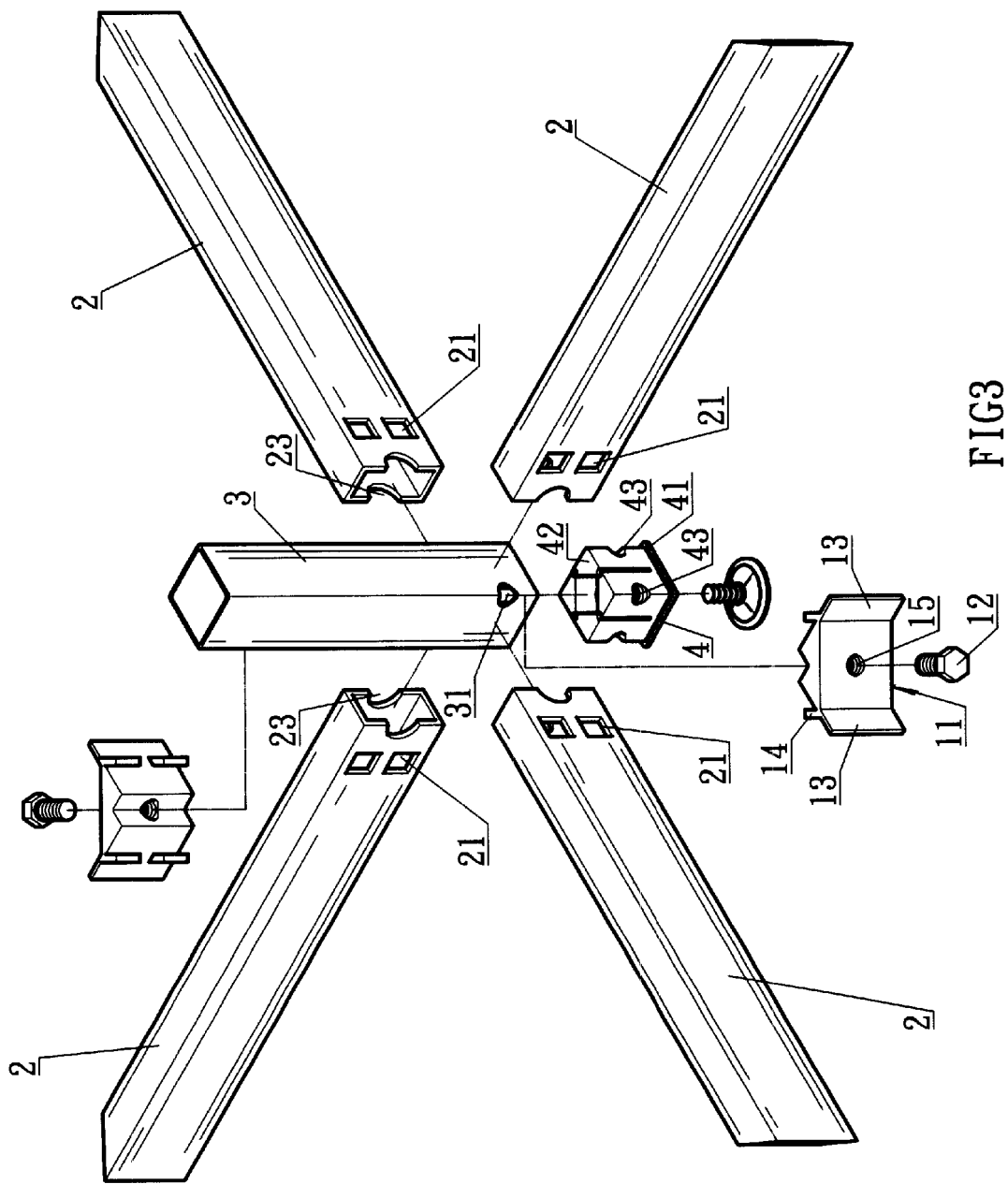
FIG. 3 is an exploded drawing of a vertical steel pipe and four transversal steel pipes.

Please refer FIG. 3, an exploded drawing of a vertical steel pipe and four transversal steel pipes. Through extruding the base on the fixture element 4, it hits the right-angle fixture base 42 on four corners of the inner wall of the vertical steel pipes 3. On each fixture base, there is a fixture screw 12, which exactly fits a vertical steel pipe. After the fixture screw 12 passing the piercing hole 15 on a joint block, it fastens the vertical steel pipe and the fixture screw holes 13 and 43 on the fixture element. Thus, the vertical steel pipe and four transversal steel pipes are firmly connected.

Figure 4:
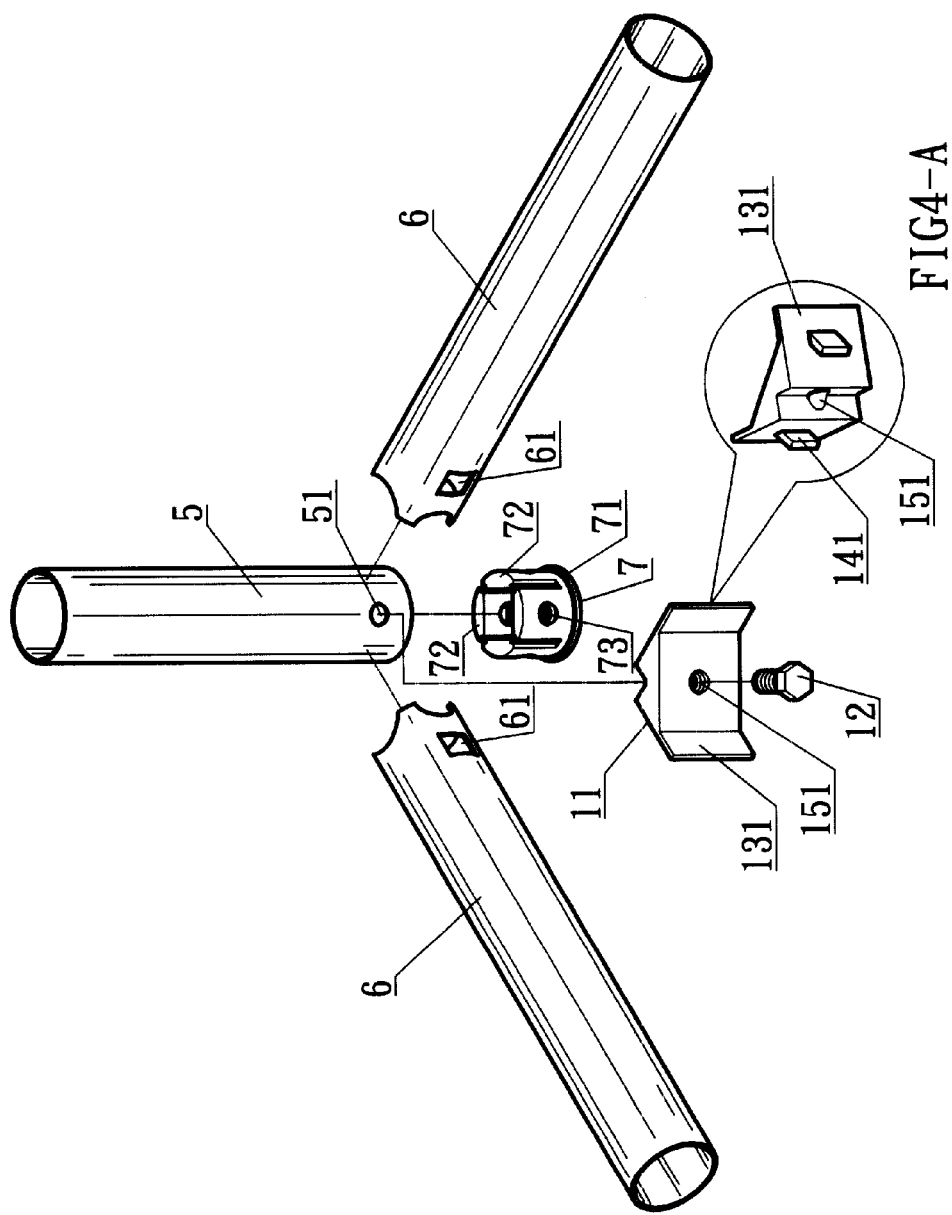
FIG. 4 is an exploded drawing of a vertical round steel pipe and two transversal steel pipes.

Please refer FIG. 4, an exploded drawing of a vertical round steel pipe and two transversal steel pipes. The joint structure 1 equips overlapped fixture screws 13 and 73 on a vertical steel pipe 5 and the bottom of a fixture element 7. The transversal round steel pipes 6 equip clip hole 61 on both of the inner sides. The extension panel 131 on both sides of a joint block 11 can perfectly be inserted into the clip holes on the insert blocks 141. In the middle of the joint block 11, there is a piercing hole 151. Through inserting the insert blocks 141 on both sides of the joint block respectively into the clip holes 61 on the transversal steel pipes, the extension panels 131 on both sides of the joint block exactly hit the inner rims of two transversal steel pipes. Thus, fixture screw 12 may pass the piercing holes 151 on the joint block and connect the vertical steel pipes and the fixture screw hole 51 and 73 on a fixture element. As a result, the transversal steel pipes 6 and vertical round steel pipes are firmly joined.

Figure 5:
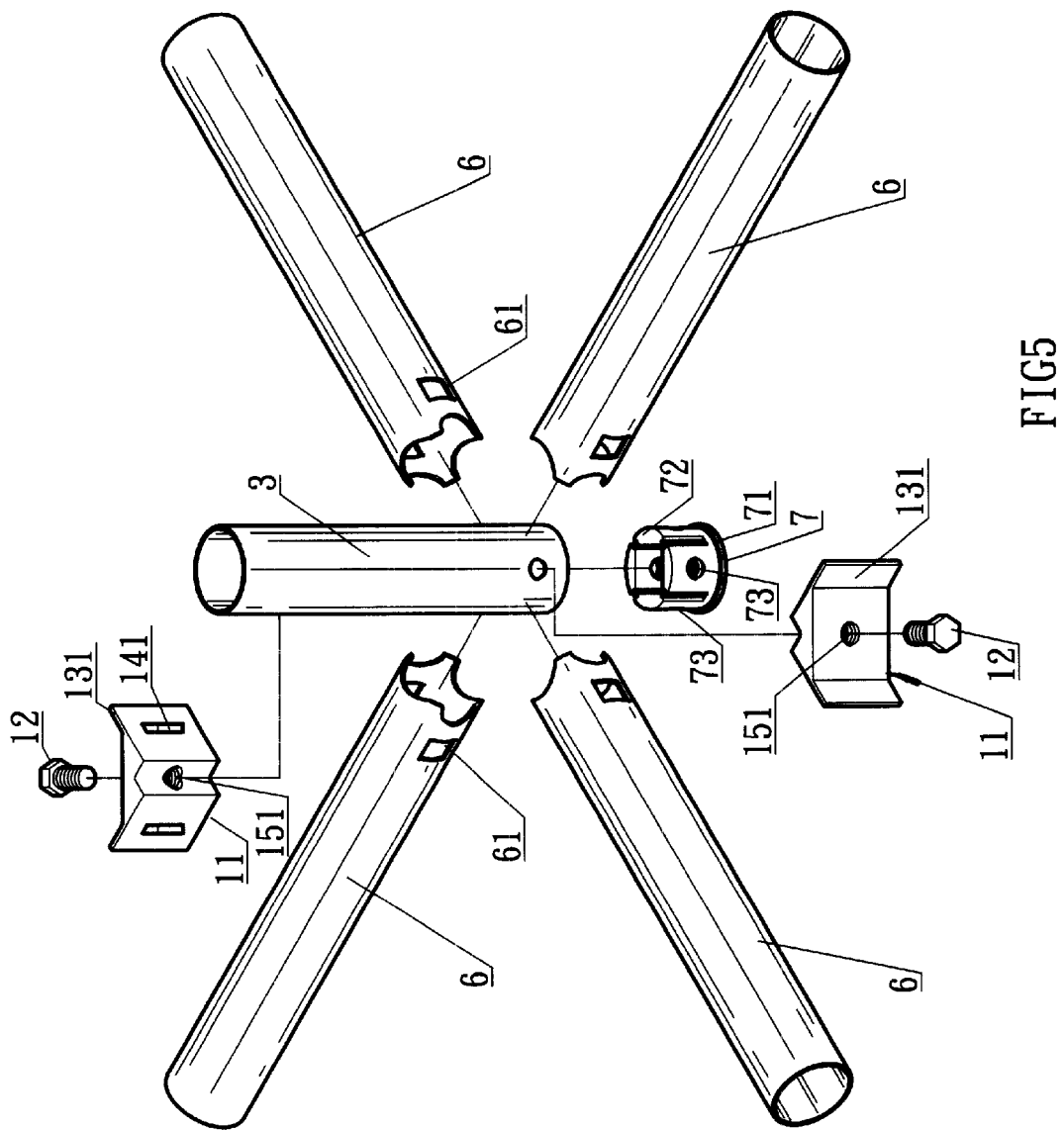
FIG. 5 is an exploded drawing of a vertical round steel pipe and four transversal steel pipes.

As shown in FIG. 5, an exploded drawing of a vertical round steel pipe and four transversal steel pipes, the bottom of a fixture element 7 equips a base 71, which fits with the inner rim of a vertical round steel pipe 5. Four corners of the base extrude upward to hit the semi-circular fixture base 72 on the inner wall of a vertical steel pipe. The fixture base equips fixture screw holes 73, which fit exactly with the vertical round steel pipes 5. Thus, the fixture screw passes the piercing holes 151 on the joint block and joins the fixture screw holes 51 and 73 on the vertical round steel pipe and the transversal steel pipes. As a result, the vertical round steel pipes and four transversal steel pipes are firmly connected.

Figure 6:
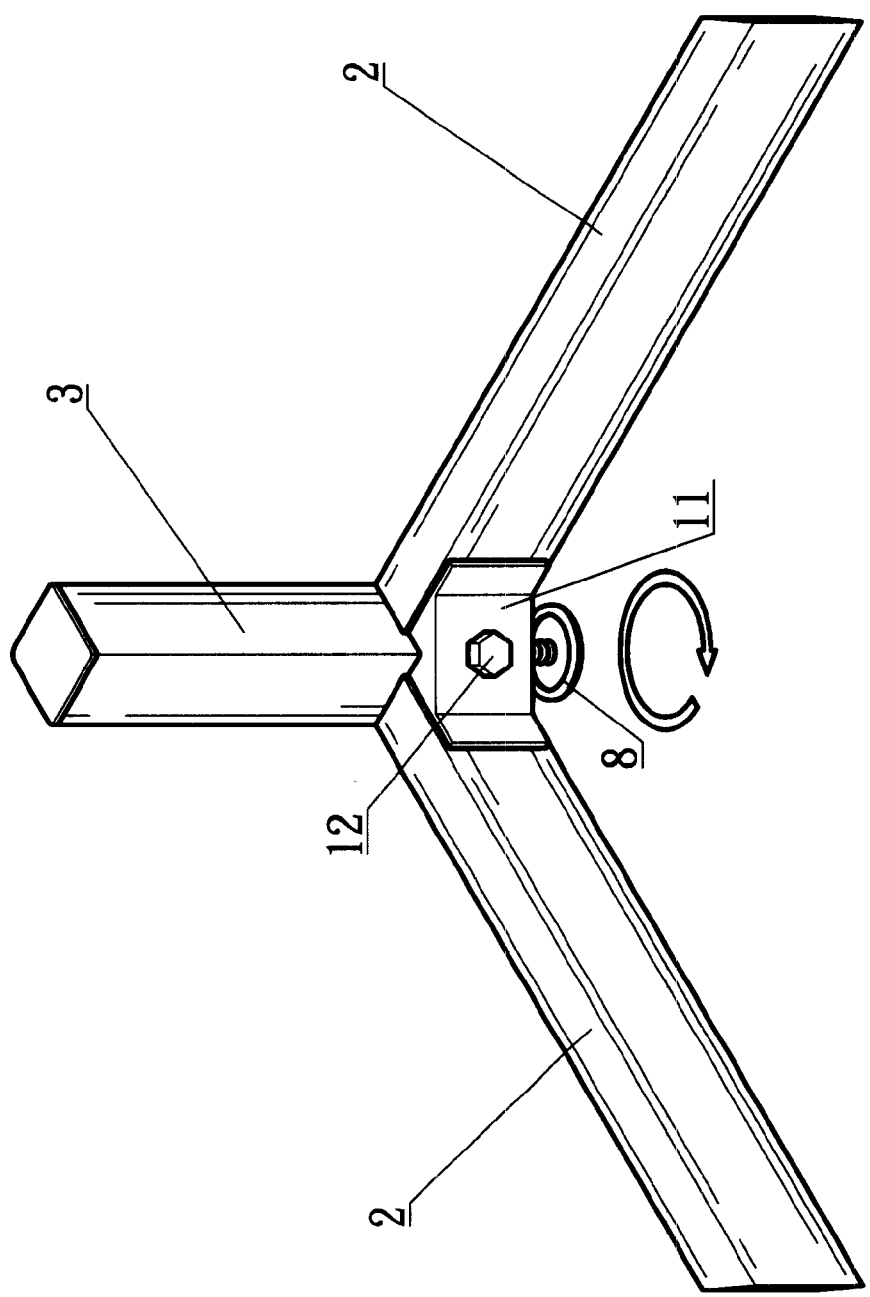
FIG. 6 is a planar drawing of an embodiment in equipping an adjustable setting block for the invention.
Figure 7:
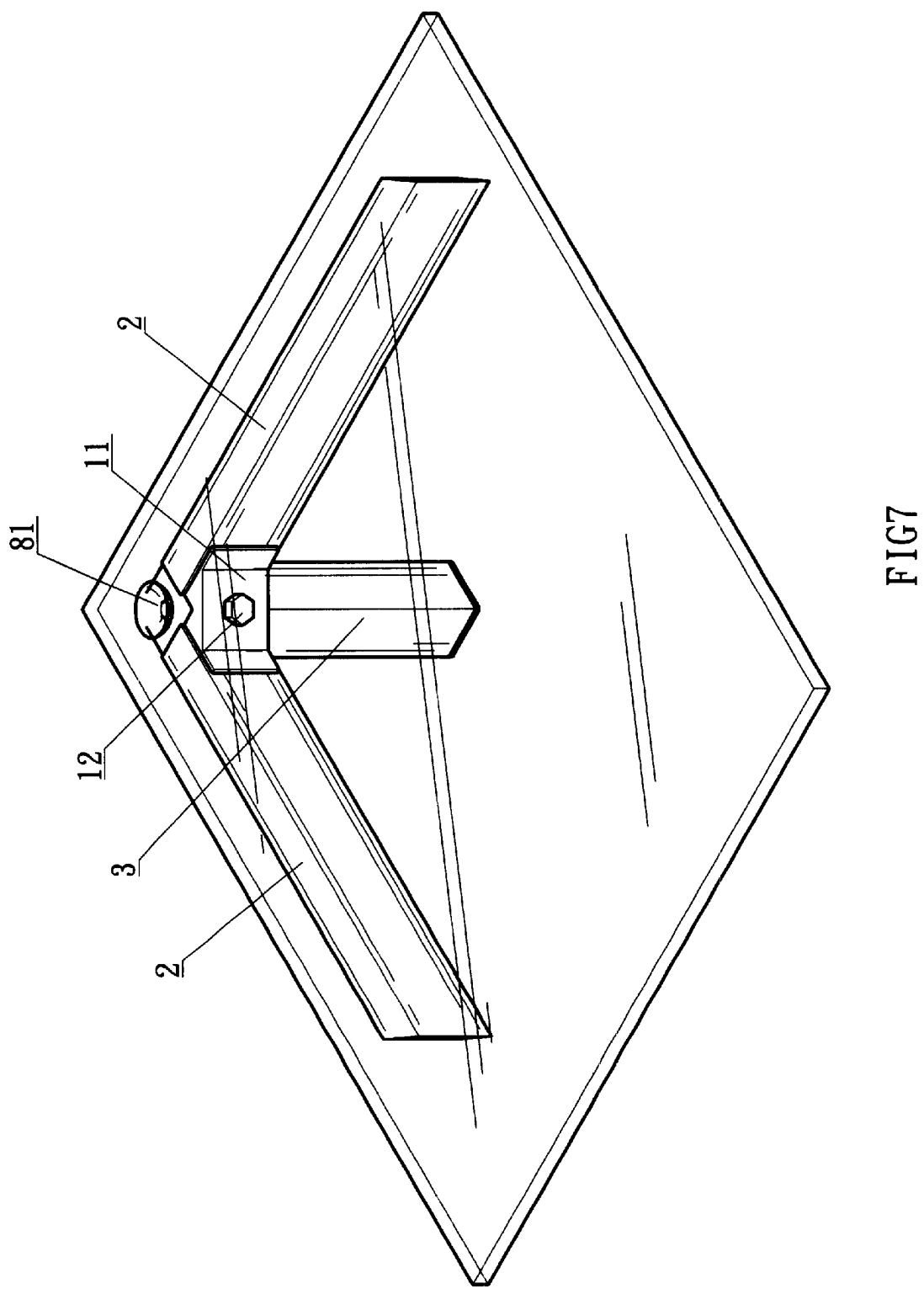
FIG. 7 is a planar drawing of a n embodiment in attaching a table with a sucking disk for the invention

Please refer FIGS. 6 and 7. Because the base screw hole 411 on each fixture element equips individually an adjustable base 8, the vertical steel pipes 3 can be used as table foot (as shown in FIG. 6). Turn the vertical steel pipe horizontally to make the base 41 of the fixture base at the utmost upper position. With the aid of a sucking disk 81 on the screw hole 411 of the base, a table glass can be laid on the top of the vertical steel pipes 3 (as shown in FIG. 7).

The above explanation is a substantial embodiment of the invention, which provides greater practical performance than products of prior art. Furthermore, the present invention meets all new patent application requirements and is lawfully submitted for review and the granting of the commensurate patent rights to thereby encourage the spirit of invention and its rightful protection under the patent law.

What is claimed is:

1. A joint structure, which strengthens steel pipe stability, comprising: a fixture element, which can be slipped into a vertical steel pipe, a joint block, which joins two transversal steel pipes on their inner sides, and a fixture screw, which fastens the joint block and the vertical steel pipe to unite both of the transversal steel pipes and the vertical steel pipe; furthermore, there are punched fixture screw holes on front corners of the vertical steel pipe; also, on both of the inner lateral ends of the transversal steel pipes, there are clip holes, of which adjacent joint ends of the two transversal steel pipes having an arched opening at a location symmetrically matching the fixture screw hole on the vertical steel pipe after connection of the transversal steel pipes thereto; furthermore, on both ends of the joint block, there are two extended panels, of which there are two adjacent insert blocks, which can be exactly inserted into the clip holes on the transversal steel pipes and there is a piercing hole in the center of each insert block; a bottom of the fixture element having a base to fit an inner wall of the vertical steel pipe and the base extrudes upward to hit a right-angle fixture base on four corners of the inner wall of the vertical steel pipe, also, the fixture base having a fixture screw hole, which exactly matches the fixture screw holes on the vertical steel pipe; furthermore, through respectively inserting the insert blocks into the clip holes on two of the transversal steel pipes, both sides of the joint block exactly hit the inner end of the two transversal steel pipes, then applying the fixture screw for fixture to achieve the effect of convenient assembly.

2. The joint structure according to claim 1, wherein the fixture base on the fixture element is rectangular, or round to respectively connect the transversal and vertical steel pipes.

3. The joint structure according to claim 1, wherein the fixture base on the fixture element extrudes upward with one, two, three, or four of the four corners of the vertical steel pipe as needed to hit the fixture base on the inner wall of a vertical steel pipe.

4. The joint structure according to claim 1, wherein the fixture element respectively connects to an adjustable base by a bottom screw hole provided on the base to directly utilize the vertical steel pipe as table foot; furthermore, turn the vertical steel pipe horizontally to make the base on the fixture base at the utmost upper position, then with the aid of a sucking disk on the bottom screw hole of the base, a table glass can be laid on the top of the vertical steel pipes.

* * * * *